(No Model.)
D. K. SMITH.
DITCHING MACHINE.
No. 590,118. Patented Sept. 14, 1897.
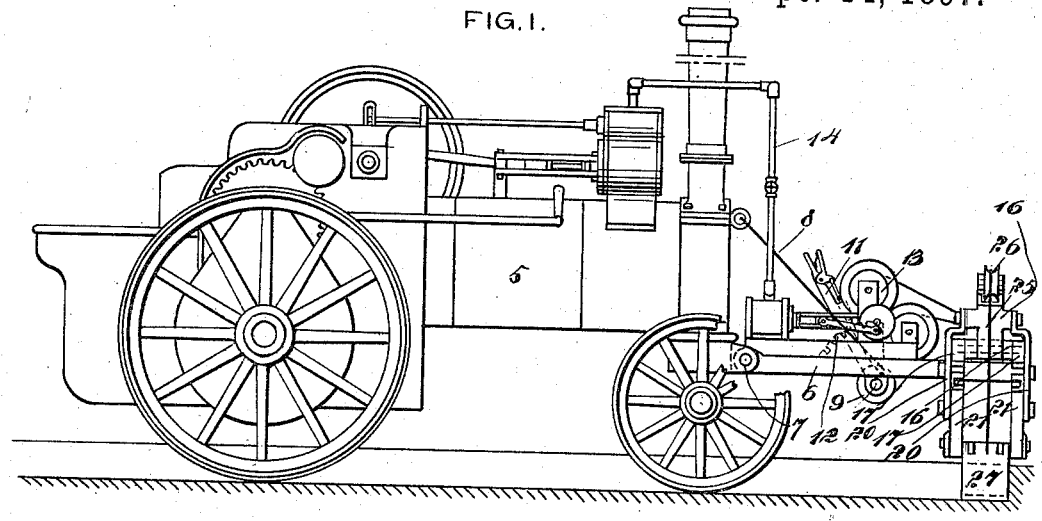
FIG. 1.
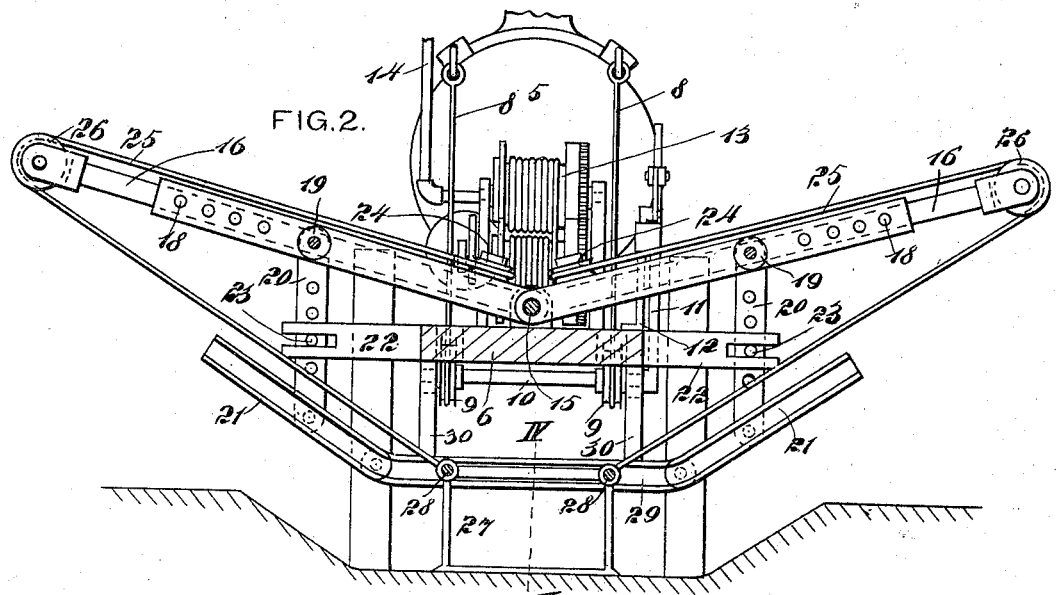
FIG. 2.
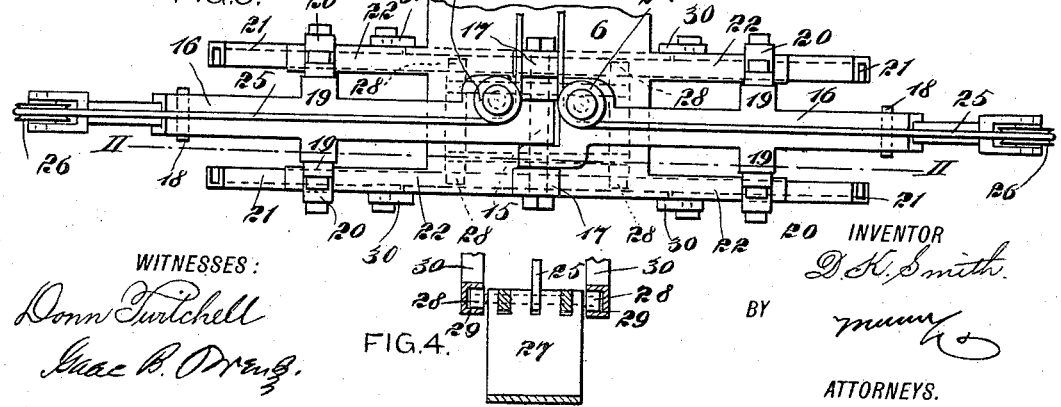
FIG. 3.
FIG. 4.
WITNESSES:
Donn Turtchell
Isaac B. Owens
INVENTOR
D. K. Smith
BY
[signature]
ATTORNEYS.

UNITED STATES PATENT OFFICE.

DAVID K. SMITH, OF PICO HEIGHTS, CALIFORNIA.

DITCHING-MACHINE.

SPECIFICATION forming part of Letters Patent No. 590,118, dated September 14, 1897.

Application filed January 14, 1897. Serial No. 619,250. (No model.)

*To all whom it may concern:*

Be it known that I, DAVID K. SMITH, of Pico Heights, in the county of Los Angeles and State of California, have invented a new and Improved Ditching-Machine, of which the following is a full, clear, and exact description.

The invention relates to an improvement in that class of ditching-machines provided with a traction-engine for propelling the machine, and also with a plow forming the ditch, the plow being operated and controlled by power derived from the traction-engine.

The invention consists in such features of construction and combinations of parts as will be fully described hereinafter and defined in the claims.

Reference is to be had to the accompanying drawings, forming a part of this specification, in which similar characters of reference indicate corresponding parts in all the figures.

Figure 1 is a side elevation of the invention. Fig. 2 is a front elevation, parts of the machine being shown in section on the line II II of Fig. 3. Fig. 3 is a fragmentary plan view of the invention, and Fig. 4 is a detail section on the line IV IV of Fig. 2.

The traction-engine 5 carries at its front end a platform 6, pivoted thereto on a transverse axis 7, and is provided with two cables 8, wound upon drums 9, fixed to a shaft 10, journaled in the platform 6. The shaft 10 is provided with a lever 11, having a thumb-latch which coacts with a ratchet 2. (See Figs. 1 and 2.) By manipulating the lever 11 the drums 9 may be operated to draw on the cables 8, which are attached at their upper ends to the upper front portion of the traction-engine. Accordingly when the drums 9 are operated the platform 6 may be raised or lowered, as desired.

Mounted on the platform 6 is a steam hoisting apparatus 13, to which steam is fed by a pipe 14 from the traction-engine. Pivoted to the front portion of the platform 6 and on a longitudinally-extending shaft 15 are two booms 16. The shaft 15 is held in longitudinally-alined lugs 17, projecting upwardly from the platform 6. The booms 16 are each constructed of two telescopic sections and are each provided with a pin 18, received in apertures in the two sections of each boom, whereby the sections may be locked in the desired relative position, and by these means the length of the boom 16 may be regulated. The inner or main section of each boom 16 is provided on each side with a transverse projection 19, to the ends of which the links 20 are respectively pivoted. The links 20 are duplicates of each other, and each link extends downwardly and out transversely to the movable end sections 21 of the plow-guides, to which the lower end of each link 20 is pivoted. As the booms 16 are adjusted on their pivots, the links 20 communicate a corresponding adjustment to the end sections 21 of the plow-guides.

Projecting transversely from the platform 6 and at the front portion thereof are arms 22. There are two of these arms on each side of the platform, and their outer ends are forked to receive pins 23, respectively carried by the links 20, the pins 23 being adjustable in openings formed in the links. By these means the booms 16 and the end section 21 of the plow-guides may be adjusted to and held in any desired position.

Mounted on the inner end of each boom 16 and having axes perpendicular to the booms are sheaves 24, and around these sheaves cables 25 pass. These cables run rearward to the hoisting-engine 13 and are so arranged with reference to said engine that upon the hauling in of one cable the other cable is let out in unison with the hauling-in movement. The outer end of each boom 16 carries a sheave 26, over which the cables 25 pass. The cables then extend downward and are connected, respectively, to the upper end portions of the plow 27, which may be of any desired construction.

The upper portion of each end of the plow 27 is provided at each side with rollers 28. The rear rollers 28 run in the stationary section 29 of the rear plow-guide and the forward rollers 28 run in the stationary section 29 of the forward plow-guide. The two plow-guides extend transversely and are duplicates in construction, the stationary sections 29 of the plow-guides being rigidly held by arms 30, depending from the platform 6. The stationary sections 29 of the plow-guides are horizontal. Consequently as the plow is adjusted transversely throughout the length of the stationary sections, the plow is maintained in the same horizontal plane. When, however, the plow begins to move in the adjustable sections 21 of the plow-guides, the plow is raised to form the inclined sides of the ditch, as shown by Fig. 2.

In the use of the apparatus the traction-engine 5 with its equipments is made to pass along the ditch, and an operator or operators standing on the platform 6 may properly control the plow. By means of the cables 8 and the drum 9 the depth at which the ditch is dug may be regulated, and by the adjustable end sections 21 the ditch may be given the desired cross-sectional form, which latter is effected by the movement of the plow transversely in its guides.

I may dispense with the plow-guide and operate the plow without the guide and yet not depart from the scope of my invention.

Having thus described my invention, I claim as new and desire to secure by Letters Patent—

1. A ditching-machine having a support, a platform pivoted thereon and projecting upwardly therefrom, means for holding the platform in position with reference to the support, two booms pivoted to the platform and projecting oppositely therefrom, a plow-guide supported beneath the platform, the end portions of the plow-guide being adjustable, means respectively connecting the booms with the end portions of the plow-guide, a plow movable transversely in the guide and supported thereby, and means for moving the plow transversely in the guide, substantially as described.

2. A ditching-machine having a support, a transverse plow-guide carried by the support, the end portions of the plow-guide being adjustable vertically, a plow movable in the guide, and means for moving the plow, substantially as described.

3. A ditching-machine having a support, a plow-guide carried by the support, the end portions of the plow-guide being adjustable, and a plow movable transversely in the guide, substantially as described.

4. A ditching-machine having a support, a transversely-extending plow-guide carried by the support, a portion of the plow-guide being adjustable, and a plow movable in the plow-guide and following the trend of the same, whereby the cross-sectional form of the ditch is regulated, substantially as described.

5. A ditching-machine having a support, a transversely-extending plow-guide carried by the support, the end portions of the plow-guide being adjustable, a plow movable in the plow-guide, two booms pivoted on the support and connected with the end portions of the plow-guide whereby said end portions move in unison with the boom, and cables running on the booms and connected to the plow-guide whereby the plow may be moved in the guide, substantially as described.

6. A ditching-machine having a support, a plow-guide held by the support and extending transversely, the end portions of the plow-guide being adjustable vertically, a plow movable in the plow-guide and following the trend thereof, two booms pivoted on the support and projecting oppositely therefrom, a link connected to each boom and respectively connected to the end portions of the plow-guide, means by which the links may be held to the support whereby the booms and their coöperating parts are held in desired position, and cables running over the booms and connected to the plow, substantially as described.

7. A ditching-machine having a support, a transverse plow-guide held by the support and having an adjustable portion, a boom pivoted on the support and connected to the adjustable portion of the plow-guide whereby the two parts move in unison, a plow carried by the guide, and a cable running on the boom and connected to the plow, substantially as described.

8. A ditching-machine having a support, a plow-guide carried by the support and having an adjustable portion, a plow movable in the plow-guide, a boom pivoted on the support and connected to the adjustable portion of the plow-guide, whereby the two parts move in unison, and means coacting with the boom and connected to the plow by which the plow may be moved, substantially as described.

9. The combination of a platform, two booms mounted on the platform on a pivot common to each boom, the booms projecting laterally opposite each other, means for adjusting the booms on their pivot, a plow located beneath the platform, and flexible connections run over the booms and attached to the plow whereby the plow may be shifted laterally beneath the platform.

DAVID K. SMITH.

Witnesses:
J. W. DUNCAN,
H. T. DUNCAN.